(12) United States Patent
Grabowski et al.

(10) Patent No.: US 10,520,903 B2
(45) Date of Patent: Dec. 31, 2019

(54) BUILDING MANAGEMENT SYSTEM WITH PRIORITY ARRAY PREVIEW INTERFACE

(71) Applicant: Johnson Controls Technology Company, Milwaukee, WI (US)

(72) Inventors: Adam R. Grabowski, Brookfield, WI (US); Prashant Taralkar, Glendale, WI (US); Alan S. Schwegler, Shorewood, WI (US); Garrett Wiens-Kind, Milwaukee, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

(21) Appl. No.: 15/794,582

(22) Filed: Oct. 26, 2017

(65) Prior Publication Data

US 2018/0143600 A1 May 24, 2018

Related U.S. Application Data

(60) Provisional application No. 62/426,209, filed on Nov. 23, 2016.

(51) Int. Cl.
*G05B 15/02* (2006.01)
*G05B 13/04* (2006.01)

(52) U.S. Cl.
CPC ............ *G05B 15/02* (2013.01); *G05B 13/04* (2013.01); *G05B 2219/2642* (2013.01)

(58) Field of Classification Search
None
See application file for complete search history.

(56) References Cited

U.S. PATENT DOCUMENTS

| 8,738,793 B2* | 5/2014 | Gutha | G05B 19/042 |
| | | | 709/230 |
| 9,152,604 B2* | 10/2015 | Hollender | G05B 15/02 |
| 9,310,786 B2* | 4/2016 | Imhof | G05B 15/02 |

(Continued)

OTHER PUBLICATIONS

Siemens, "BACnet Application Guide for Consulting Engineers", Jan. 2012, Siemens Building Technology, pp. 8-12,41-43,63-65; https://w3.usa.siemens.com/buildingtechnologies/us/en/consulting-engineer/engineeradvantage/Documents/BACnet%20Application%20Guide%20for%20Consulting%20Engineers%20125-1984T.pdf(Year: 2012).*

(Continued)

*Primary Examiner* — Carlos R Ortiz Rodriguez
*Assistant Examiner* — David Earl Ogg
(74) *Attorney, Agent, or Firm* — Foley & Lardner LLP

(57) ABSTRACT

A building management system includes a controller for one or more devices of the building management system and a system manager communicably coupled to the controller. The controller includes a priority array for a point object managed by the controller. The priority array includes a plurality of commands for the point object and defines a priority of each command. The system manager is configured to retrieve the priority array from the controller, generate a user interface identifying the plurality of commands in the priority array and the priority of each command, receive a new command from a user, and update the user interface to include a preview of the priority array indicating how the priority array would change if the new command were applied to the priority array.

18 Claims, 4 Drawing Sheets

(56) References Cited

U.S. PATENT DOCUMENTS

2011/0087988 A1* 4/2011 Ray .................. G06Q 10/06
 715/771
2018/0052448 A1* 2/2018 Joshi .................. G05B 19/418

OTHER PUBLICATIONS

Schneider Electric, "SE8600 Series BACnet Integration", Apr. 2015, Schneider Electric, pp. 41-43; http://www.kele.com/Catalog/22%20Thermostats_Controllers/PDFs/SE8600%20RTU%20HPIAQ%20BACNET%20INTEGRATION%20GUIDE.pdf (Year: 2015).*
Laird, Visualizing BACnet, ASHRAE Journal, Nov. 2009, 5 pages.
Schneider Electric, SE8600 Series BACnet Integration Rooftop Unit and Indoor Air Quality Controller Commercial and Lodging HVAC Applications BACnet Controller, Nov. 2014, 41 pages.
Search Report for International Application No. PCT/US2017/058780, dated Feb. 21, 2018, 15 pages.

\* cited by examiner

BUILDING MANAGEMENT SYSTEM WITH PRIORITY ARRAY PREVIEW INTERFACE

CROSS-REFERENCE TO RELATED PATENT APPLICATION

This application claims the benefit of and priority to U.S. Provisional Patent Application No. 62/426,209 filed Nov. 23, 2016, the entire disclosure of which is incorporated by reference herein.

BACKGROUND

The present disclosure relates generally to building management systems. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS typically monitors and controls many different data points. Data points in a BMS can include, for example, measured values, calculated values, setpoints, operating parameters, or other types of data which can be used to monitor and control the BMS. Data points can be represented as data objects (e.g., BACnet objects, point objects, etc.) which have a variety of attributes describing the data point (e.g., present value, source ID, unit of measure, etc.). Some data points can be set or adjusted by multiple different systems or devices, which can lead to conflicts in the value of the data point. It can be difficult and challenging to manage data points in a BMS.

SUMMARY

One implementation of the present disclosure is a building management system including a controller for one or more devices of the building management system and a system manager communicably coupled to the controller. The controller includes a priority array for a point object managed by the controller. The priority array includes a plurality of commands for the point object and defines a priority of each command. The system manager is configured to retrieve the priority array from the controller, generate a user interface identifying the plurality of commands in the priority array and the priority of each command, receive a new command from a user, and update the user interface to include a preview of the priority array indicating how the priority array would change if the new command were applied to the priority array.

In some embodiments, the system manager is configured to apply the new command to the priority array. The new command may cause the controller to adjust an operation of the one or more devices. The system manager can be configured to present the preview of the priority array to the user before the new command is applied to the priority array to allow the user to preview an effect of the new command before the new command takes effect.

In some embodiments, the system manager is configured to determine which of the plurality of commands in the priority array would have a highest priority if the new command were applied to the priority array update the preview of the priority array to indicate which of the plurality of commands in the priority array would have the highest priority.

In some embodiments, the system manager is configured to determine whether the new command is the command that would have the highest priority and, in response to a determination that the new command would not have the highest priority, update the user interface to include a notification that the new command will not affect an operation of the controller because another command in the priority array has a higher priority.

In some embodiments, the new command is a command to adjust a value of the point object. In some embodiments, the system manager is configured to identify one or more of the plurality of commands in the priority array that would be bypassed or deleted as a result of applying the new command to the priority array and update the preview of the priority array to indicate which of the plurality of commands in the priority array would be bypassed or deleted. In some embodiments, the system manager is configured to identify a priority of the new command relative to each of the plurality of commands in the priority array and update the preview of the priority array to indicate the priority of the new command relative to each of the plurality of commands in the priority array.

In some embodiments, the new command is a command to release one or more of the plurality of commands in the priority array. In some embodiments, the system manager is configured to identify one or more of the plurality of commands in the priority array that would be deleted as a result of applying the new command to the priority array and update the preview of the priority array to indicate which of the plurality of commands in the priority array would be deleted.

In some embodiments, the user interface comprises, for each command in the priority array, an indication of a user that issued the command.

Another implementation of the present disclosure is a method for previewing changes to a priority array in a building management system. The method includes retrieving a priority array from a controller for one or more devices of the building management system. The priority array includes a plurality of commands for a point object managed by the controller and defines a priority of each command. The method includes generating a user interface identifying the plurality of commands in the priority array and the priority of each command, receiving a new command from a user, and updating the user interface to include a preview of the priority array indicating how the priority array would change if the new command were applied to the priority array.

In some embodiments, the method includes applying the new command to the priority array. The new command may cause the controller to adjust an operation of the one or more devices. The method may include presenting the preview of the priority array to the user before the new command is applied to the priority array to allow the user to preview an effect of the new command before the new command takes effect.

In some embodiments, the method includes determining which of the plurality of commands in the priority array would have a highest priority if the new command were applied to the priority array updating the preview of the priority array to indicate which of the plurality of commands in the priority array would have the highest priority.

In some embodiments, the method includes determining whether the new command is the command that would have the highest priority and, in response to a determination that the new command would not have the highest priority, updating the user interface to include a notification that the new command will not affect an operation of the controller because another command in the priority array has a higher priority.

In some embodiments, the new command is a command to adjust a value of the point object. In some embodiments, the method includes identifying one or more of the plurality of commands in the priority array that would be bypassed or deleted as a result of applying the new command to the priority array and updating the preview of the priority array to indicate which of the plurality of commands in the priority array would be bypassed or deleted. In some embodiments, the method includes identifying a priority of the new command relative to each of the plurality of commands in the priority array and updating the preview of the priority array to indicate the priority of the new command relative to each of the plurality of commands in the priority array.

In some embodiments, the new command is a command to release one or more of the plurality of commands in the priority array. In some embodiments, the method includes identifying one or more of the plurality of commands in the priority array that would be deleted as a result of applying the new command to the priority array and updating the preview of the priority array to indicate which of the plurality of commands in the priority array would be deleted.

In some embodiments, the user interface includes, for each command in the priority array, an indication of a user that issued the command Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the figures, a priority array for a point object in a BMS is described, and more particularly a user interface for presenting priority array information to a user is described. The point object can include any of a variety of data objects (e.g., BACnet objects) that represent a particular data point in the BMS (e.g., a setpoint, an operating parameter, an operating mode, etc.). In some embodiments, the point object is used by a controller in the BMS to monitor and control the BMS. A priority array for a point object may generally include a plurality of commands or settings, each command or setting corresponding with a different priority or rank. The systems and methods described herein allow a user to view the priority array for a point object, allowing the user to see how the operation of the controller using the point object may be impacted based on a user input and/or the conditions in the building area.

As one example, a setpoint object may be used by a controller for controlling the temperature of an area or room in a building. Each command in a priority array for the setpoint object may include a different setpoints, each command relating to e.g., a default setting, a specific setpoint for a given time of day, a specific setpoint based on occupancy of the area, a specific setpoint specified by a user, etc. The controller may determine which command to use based on the priority rank of each command and the current conditions in the building area. As described in the present disclosure, the user may be presented with such information, allowing the user to view how the controller controls the building area and the impact of user input (and other conditions) on the controller and priority array.

In one embodiment, the systems and methods herein may be applicable for a controller for an HVAC device. For example, a controller for adjusting the temperature of one or more rooms in a building may use the priority array as described in the present disclosure to control the temperature. While a temperature controller is generally described in the present disclosure, it should be understood that in various embodiments, the priority array described herein may be implemented for any type of controller and/or data point in any type of environment or management system.

Figure 1:
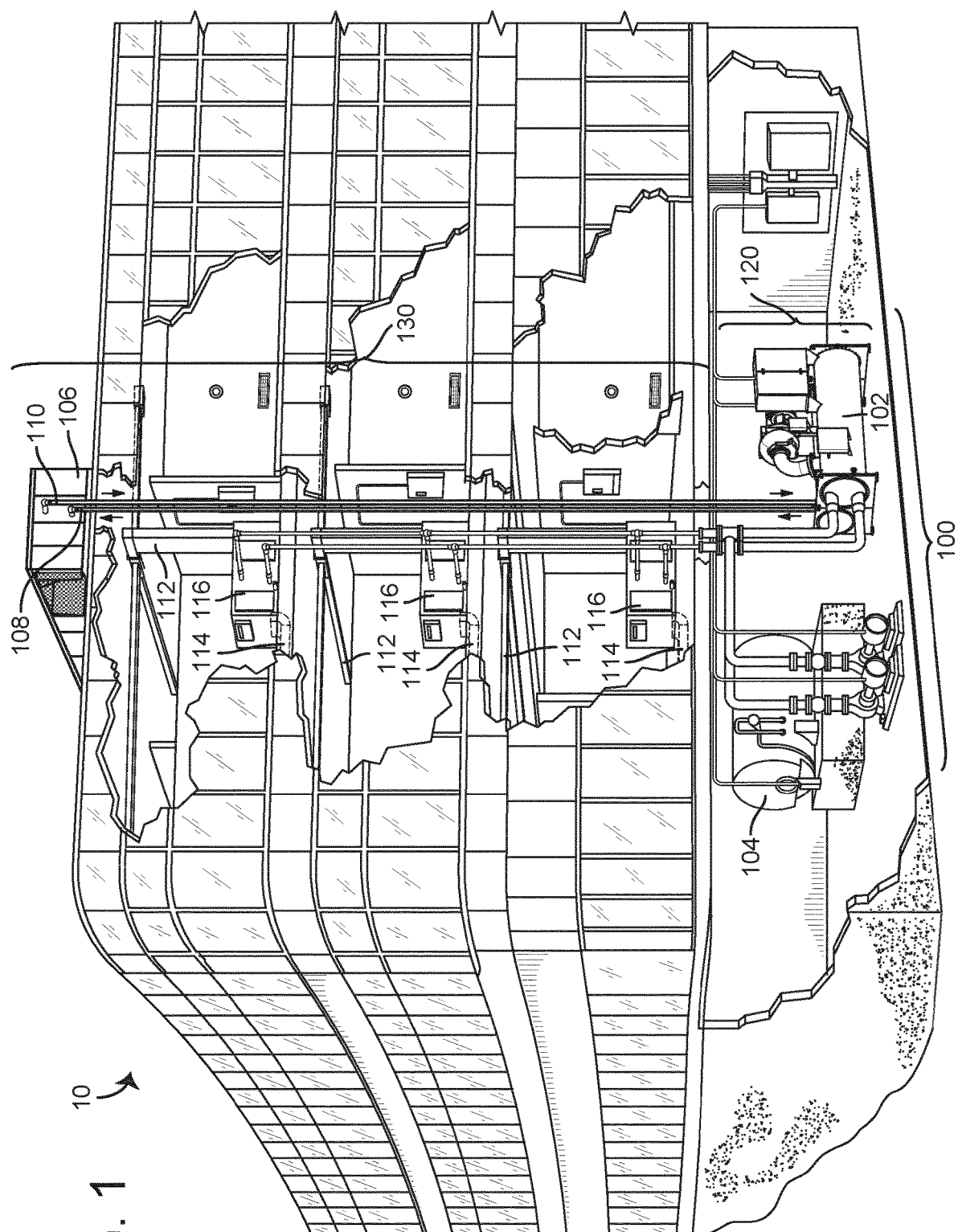
FIG. 1 is a drawing of a building equipped with a BMS, according to an exemplary embodiment.

Referring now to FIG. 1, an exemplary building and HVAC system in which the systems and methods of the present invention can be implemented are shown, according to an exemplary embodiment. The building and HVAC system of FIG. 1 is provided as an example environment in which a priority array may be implemented for a controller of the HVAC system.

In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
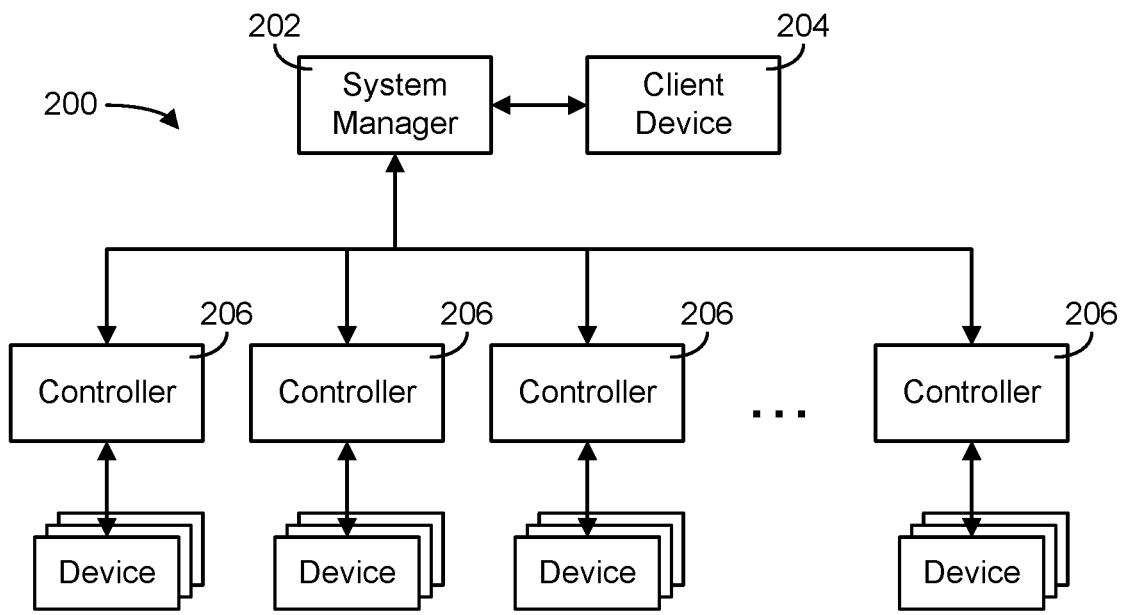
FIG. 2 is a block diagram of a BMS which can be used to monitor and control the building of FIG. 1, according to an exemplary embodiment.

Referring now to FIG. 2, a block diagram of an example BMS 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the various types of BMS devices, such as HVAC system 100.

In brief overview, BMS 200 provides a system architecture that facilitates various features such as equipment discovery, communications between equipment, equipment model distribution, and the like. BMS 200 may communicate with the controllers of the various devices in the BMS across multiple different communications busses and across multiple different communications protocols. BMS 200 is shown to include a system manager 202. System manager 202 may communicate with a client device 204 (e.g., a user device, desktop computer, laptop computer, mobile device, computer server with a user interface, tablet, smartphone, or any other type of mobile or non-mobile device) via a data communications link (e.g., BACnet IP, Ethernet, wired or wireless communications, etc.). System manager 202 can provide a user interface to client devices 204 which allows users to monitor and/or control BMS 200 via client devices 204. For example, referring to the present disclosure, a user may view the status of a priority array for a given controller via system manager 202 and client device 204.

In various embodiments, BMS 200 includes a plurality of controllers 206. Controllers 206 may generally control various devices and facilitate communications between devices in a particular zone or area. System manager 202 may be connected with controllers 206 via a plurality of buses which may include a variety of communications hardware (e.g., wire, optical fiber, terminals, etc.) for facilitating the communications via any type of wired or wireless communications protocol. Each bus connecting a controller 206 with system manager 202 may have its own communications protocol. BMS 200 may further includes busses connecting each device with its corresponding controller 206.

Controllers 206 may be configured to monitor and command various one or more devices in BMS 200. In some embodiments, each controller 206 monitors and commands a device in a particular area, and connects the device to the rest of the BMS 200 and system manager 202 in particular. Each area or zone a controller may be responsible for may include a plurality of devices such as one or more zone controllers, dampers, RTUs, sensors, actuators, chillers, heaters, fans, pumps, etc. Controller 206 may communicate with the individual devices via any type of communications protocol. It should be understood that the configuration of controllers and devices in BMS 200 may vary without departing from the scope of the present disclosure.

Each controller 206 may monitor and control a different building area and the one or more devices therein. Controller 206 may generally use the inputs provided by the various devices (e.g., temperature sensors, humidity sensors, occupancy sensors, etc.) and inputs from system manager 202 and/user client device 204 to monitor and control a building area. For example, a controller 206 can use a temperature input received from networked sensors as feedback in a temperature control algorithm. Controller 206 may use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in a building or area within the building.

As one example, a controller 206 may control various elements of an HVAC system. An HVAC system may include, for example, an AHU (as described in FIG. 1) which may vary the amount of outside air and return air used for heating or cooling a building area. The AHU can receive return air via a return air duct and can deliver supply air to a building area via a supply air duct. The AHU can operate one or more dampers (e.g., exhaust air damper, mixing damper, outside air damper, etc.) to control the amount of outside air and return air combined to create the supply air. Each damper can be operated by an actuator, and each actuator may be controlled by controller 206 accordingly. The AHU can further include a cooling coil and heating coil to heat or cool the air, and one or more fans to force the air through the coils. The AHU can further include multiple valves to control the flow of chilled fluid or heated fluid in the unit, controlling the cooling or heating of the supply air. Controller 206 may use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control the actuators, coils, fans, valves, and other components of the AHU. More particularly, referring to the present disclosure, each command in a priority array for a controller 206 may include a control algorithm including settings for controlling the actuators, coils, fans, valves, and other components of the AHU.

Figure 3:
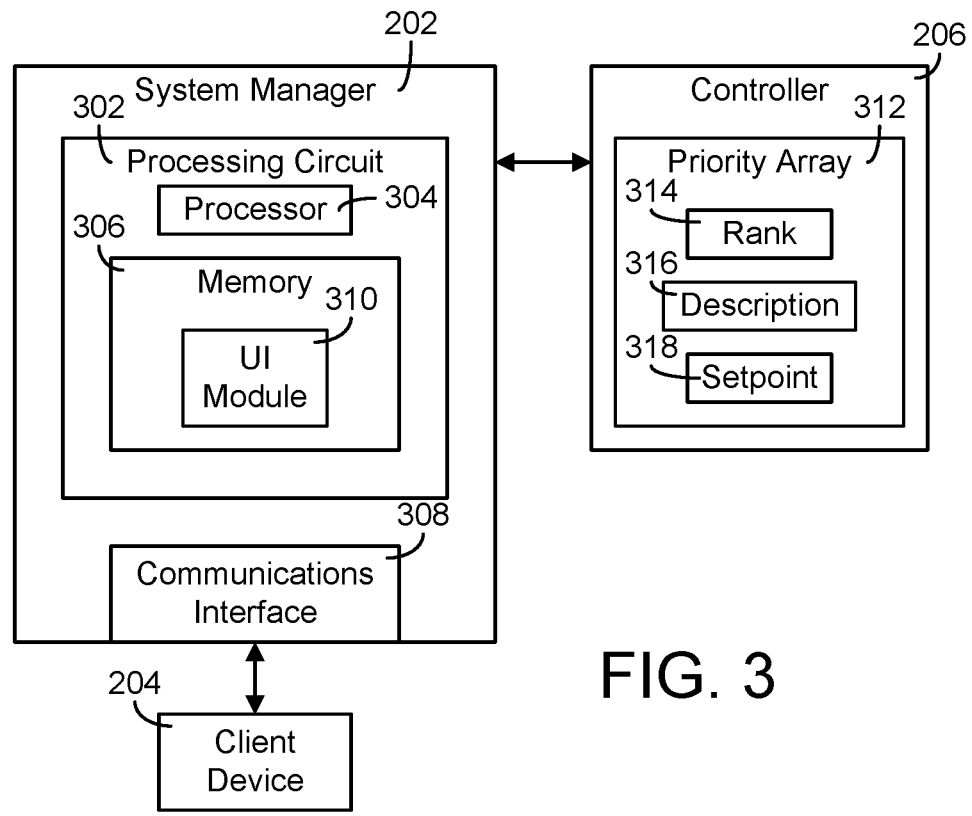
FIG. 3 is a block diagram illustrating the system manager and controller of FIG. 2 in greater detail, according to an exemplary embodiment.

Referring to FIG. 3, a block diagram of system manager 202 and controller 206 is shown in greater detail. More particularly, FIG. 3 illustrates a block diagram of a system for implementing a priority array for operation of a controller 206. As described above, a priority array may include a plurality of commands or settings for a controller 206. Each command includes a setpoint and one or more conditions for executing the command. As shown in FIG. 3, the priority array may be stored and implemented within controller 206; it should be understood that the embodiment shown in FIG. 3 is not limiting. For example, in other embodiments, the priority array may be implemented within system manager 202, which may receive various sensor inputs from controller 206 and use the sensor inputs along with inputs from client device 204 to determine settings for controller 206. As another example, BMS 200 may not include a system manager 202 and each controller may implement its priority array locally, with input from client device 204. Further, activities executed in system manager 202 may be implemented in a controller 206 or vice versa.

As described above, controller 206 is configured to control the operation of devices in a building area or zone based on a priority array. The priority array includes multiple commands, each command including a setpoint and one or more conditions for executing the command. Controller 206 may choose which command to execute based on various inputs and the rank/priority of each command.

Controller 206 is shown to include a priority array 312. Priority array 312 includes a plurality of commands, each command relating to unique settings for one or more devices. For example, if controller 206 is configured to control a temperature in a building area, each command stored in priority array 312 may specify a setpoint temperature value along with one or more conditions that may cause the particular command to be used by controller 206. The conditions may include a status of a building area, such as if the building area is empty or occupied or if an important function is taking place in the building area. For example, the conditions may indicate if controller 206 needs to adjust operation (e.g., heat or cool an area) to accommodate people present in the building area, or to adjust for optimal energy usage in the building area.

Each command in priority array 312 may generally include a rank 314, a description 316, and a setpoint 318. The rank 314 specifies the priority of each command (i.e., which command should supersede other commands when both commands are applicable). For example, one command may relate to a default temperature setting for an energy conversation mode, while a second command may relate to a minimum temperature setting. The second command may have a higher priority or rank, indicating that the second command takes precedence in the priority array when the temperature is too low. The rank 314 of each command may vary based on the importance of the conditions (e.g., higher ranks may be given to commands that have a larger impact on operations within a building, or to user-given commands). In one embodiment, rank 314 may be a value from 1 to 16, with 1 being the highest priority and 16 the lowest. Of course, in other embodiments, the values (and number of values) used to represent a rank for a given command may vary.

Some commands in priority array 312 may be considered automatic. If a condition for a command reaches a threshold value, the command may be automatically triggered by priority array 312 based on its high rank. For example, if the temperature in a given area falls below a threshold value, a heating command with a very high rank may be automatically triggered by controller 206.

Figure 4:
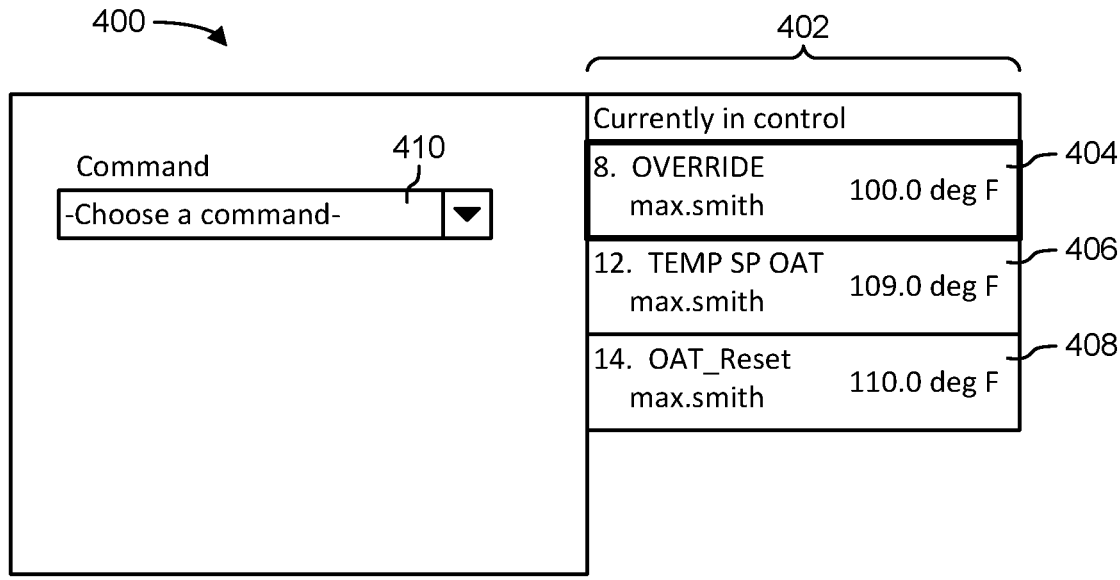
FIG. 4 is a drawing of a user interface displaying a priority array for a point object, according to an exemplary embodiment.
Figure 5:
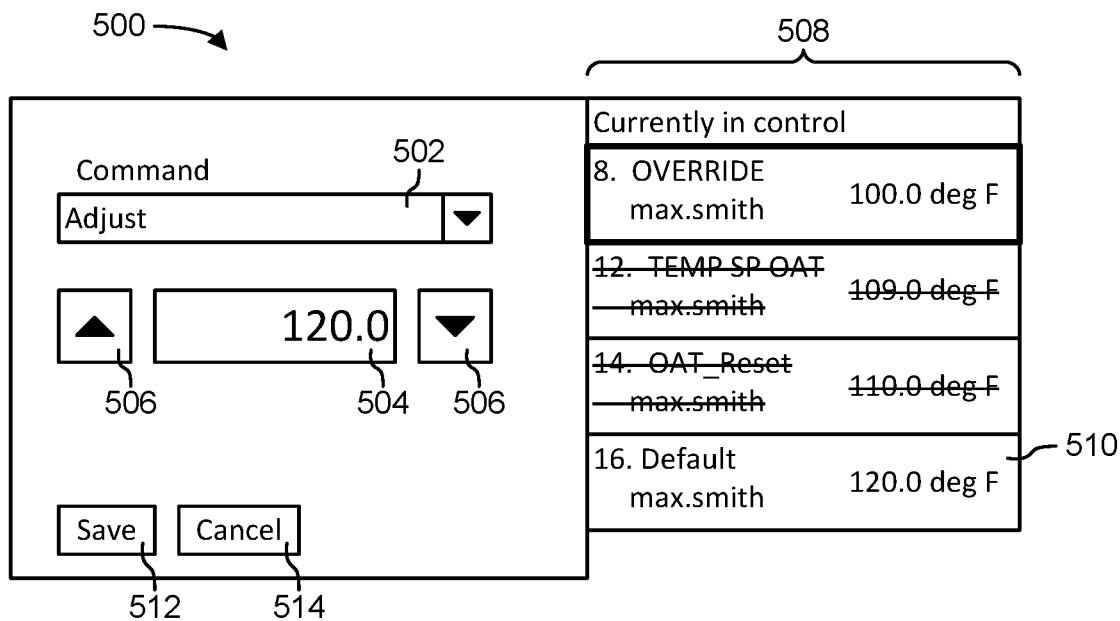
FIG. 5 is a drawing of the user interface of FIG. 4 displaying a preview of how the priority array would be affected by a user adjustment to the commands in the priority array, according to an exemplary embodiment.
Figure 6:
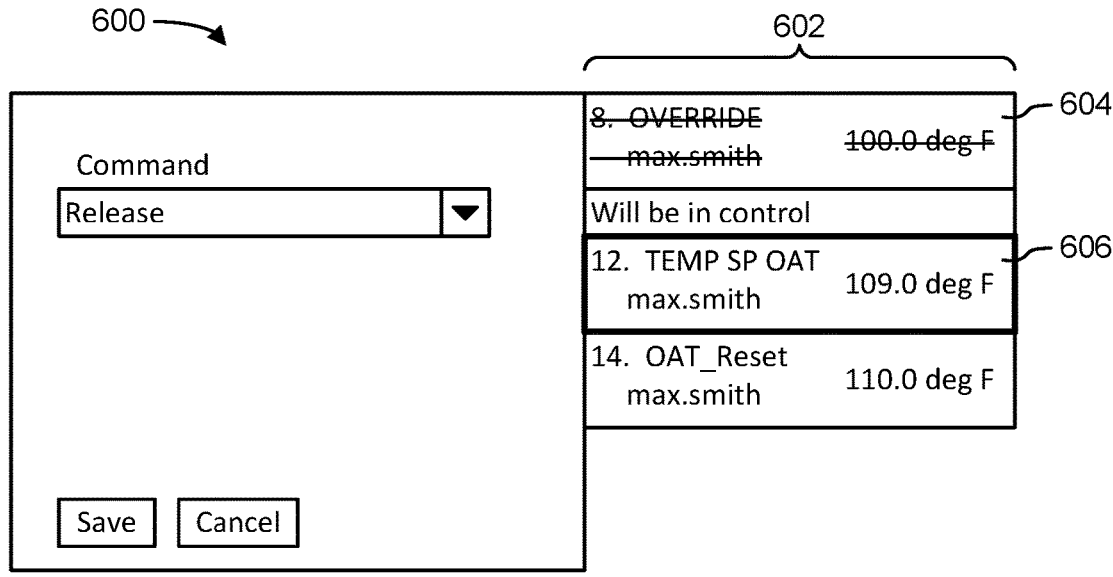
FIG. 6 is a drawing of the user interface of FIG. 4 displaying a preview of how the priority array would be affected by a user releasing a command in the priority array, according to an exemplary embodiment.

The description 316 identifies the one or more conditions that may cause the command to be used by controller 206. This description may be provided to a user via a client device, as shown in FIGS. 4-6 below. The setpoint 318 indicates the setting to be achieved by controller 206. Setpoint 318 may be a single value or may be multiple values that are part of a control algorithm.

Each command in priority array 312 may be stored in controller 206, and the decision of which command takes priority may vary based on input from various sensors and devices in the building area, and on input from a user via a client device. In some embodiments, commands may be pre-programmed or pre-stored in controller 206, and controller 206 can subsequently choose which command in the priority array to use based on sensor and user inputs. Controller 206 may further receive commands from client device 204, and may add the commands to priority array 312 (either temporarily or permanently). Controller 206 and priority array 312 may include any number of pre-stored commands, user-provided commands, and override commands, and it should be understood that the creation of such commands is not limiting to the present disclosure.

The following are example conditions that may be associated with a command implementable by controller 206. The following list is not limiting and is only intended to provide example commands that may be part of a priority array:

Override command: An override command may be a command provided by a user via a user interface, as described below. The override command may include a user-specified setting.

User adjustment: The user may provide an adjustment to a current temperature in an area. For example, the user may wish to raise or lower the temperature of a room by one or two degrees. One or more commands in the priority array may relate to such changes.

Temperature: Based on an input from a temperature sensor, controller 206 may wish to heat or cool a building area. A command with a corresponding rank may be chosen by controller 206 from priority array 312. For example, if equipment or objects in an area require a minimum or maximum temperature, controller 206 may select a command in the priority array to prevent the minimum or maximum from being reached.

Occupancy: Based on the number of occupants in an area, or if the area is occupied at all, controller 206 may wish to heat or cool a building area. A command with a corresponding rank may be chosen by controller 206 from priority array 312. For example, for an occupied area, a command with a higher priority rank associated with occupancy may be chosen, while for an unoccupied area, a lower priority ranked command may be chosen).

Release: The user may "release" a current setting or command. For example, if the user has provided a manually-entered setting, the user may subsequently "release" the command, causing controller 206 to retrieve a lower ranked command from priority array 312.

Device resetting: If a device for controlling the temperature in an area is reset, upon rebooting, controller 206 may select a command from priority array 312 corresponding with the state of the device, allowing the temperature in the building area to stabilize.

Controller 206 may further include various modules for enabling communications and control of one or more devices. Further, controller 206 may store equipment models which generally detail the various equipment under control of controller 206. In one embodiment, controller 206 can create BACnet objects, each object having one or more properties or settings that define a current status of an equipment to controller 206. Controller 206 may control each individual equipment or device by through the BACnet object.

System manager 202 may generally include a communications interface 308 for facilitating communications between the system manager and external systems, devices, or applications. For example, communications interface 308 can facilitate communications with client device 204, monitoring and reporting applications for a building area, enterprise control applications, remote systems and applications, and/or other external systems or devices for allowing user control, monitoring, and adjustment to BMS 200 and/or system manager 202. For example, a monitoring system or application may provide settings to system manager 202 via communications interface 308 that may cause a selection of a different command in a priority array of a controller. Communications interface 308 may include wired or wireless interfaces for communicating via any protocol with any type of device (e.g., a port for sending and receiving data via an Ethernet-based link, cellular transceivers for sending and receiving data from a mobile phone, a power line communications interface, a wireless interface, etc.).

System manager 202 is shown to include a processing circuit 302 including a processor 304 and memory 306. Processor 304 can be a general purpose or specific purpose processor, an application specific integrated circuit (ASIC), one or more field programmable gate arrays (FPGAs), a group of processing components, or other suitable processing components. Processor 304 is configured to execute computer code or instructions stored in memory 306 or received from other computer readable media (e.g., CDROM, network storage, a remote server, etc.). Memory 306 can include one or more devices (e.g., memory units, memory devices, storage devices, etc.) for storing data and/or computer code for completing and/or facilitating the various processes described in the present disclosure. Memory 306 can include random access memory (RAM), read-only memory (ROM), hard drive storage, temporary storage, non-volatile memory, flash memory, optical memory, or any other suitable memory for storing software objects and/or computer instructions. Memory 306 can include database components, object code components, script components, or any other type of information structure for supporting the various activities and information structures described in the present disclosure. Memory 306 can be communicably connected to processor 304 via processing circuit 302 and can include computer code for executing (e.g., by processor 304) one or more processes described herein. When processor 304 executes instructions stored in memory 306, processor 304 generally configures system manager 202 (and more particularly processing circuit 302) to complete such activities.

Memory 306 is shown to include a user interface (UI) module 310 configured to generate a user interface for client device 204. UI module 310 may generate a user interface allowing a user to view priority array information for a given controller. Referring also to FIGS. 4-6, example user interfaces that may be generated by UI module 310 are shown.

As described above, the user interfaces generated by system manager 202 and more particularly UI module 310 may allow the user to view the impact of a command on the operation of controller 206 and the condition of a building area as a whole. The user may provide a command through client device 204 such as raising or lowering the temperature of the building area. After entering the command, the user interface generated by UI module 310 may present to the user how the command impacts the priority array for the controller responsible for the temperature of the building area. For example, the user interface may show which commands in the priority array are being superseded by the user-generated command. Further, if a command in the priority array has a higher rank than the command provided by the user, the user may receive such an indication via the user interface. This may generally make the user aware as to how the command he or she is providing will impact the priority array, controller, and building area. For example, the user may see that the command may put undue stress on the various devices or cause extreme energy usage, or the user may see that one or more commands usually executed by the controller may be superseded by the user-entered command.

Referring to FIG. 4, UI module 310 may present user interface 400 on client device 204 to the user detailing the current status of a priority array 402 of the controller. For example, in priority array 402, three commands are shown: a first command 404 for an override command (i.e., a manually entered temperature setpoint from a user), a second command 406 labeled "Temp SP OAT" (relating to a temperature setpoint based on the outside air temperature), and a third command 408 labeled "OAT-Reset" (relating to a temperature setpoint based on the changing outside air temperature). Each command may be triggered based on different conditions (e.g., command 408 may only be chosen if a significant enough change in outside air temperature based on the time of year is detected, while command 406 may be chosen based on more short-term considerations), and may be associated with a corresponding rank (e.g., commands with a higher rank may be more reactionary while commands with a lower rank may be more seasonal). User interface 400 is shown to indicate that command 404 is currently being followed by controller 206.

In user interface 400, priority array 402 currently indicates that override command 404 with a rank of 8 is currently in control (i.e., controller 206 is currently controlling the devices in the area to cause the temperature to be at 100° F.). For example, interface 400 can highlight, outline, color/shade, or otherwise indicate the command currently in control. Override command 404 is shown as having a higher rank than the other commands that can currently be active. The list of commands shown in priority array 402 may vary based on the commands that are currently available or valid to controller 206. For example, some commands may not be applicable based on the current status of the building area (e.g., conditional commands relating to room occupancy or temperature for which the condition is not currently satisfied). Priority array 402 is shown to only display three available commands, while other commands stored in the priority array are not applicable given the current status of the building area and therefore not shown.

User interface 400 includes a field 410 from which a user may select a command. Using field 410, the user may begin to enter a new command, such as an adjustment in temperature in the building area, the release of a command in priority array 402, or the like. Referring also to FIG. 5 and user interface 500, the user is shown to have selected the adjust command 502, which allows the user to enter a new temperature setpoint. User interface 500 is shown displaying a preview of how priority array 508 would be affected by a user adjustment to the commands in priority array 508.

As shown in field 504, the user has entered a new temperature setpoint of 120° F., compared to the current temperature setpoint of 100° F. User interface 500 is shown to include multiple UI elements 506 for entering the new temperature setpoint. In various embodiments, the user may enter new setpoint via any number of UI elements or input devices (e.g., keyboard, mouse, touchscreen, etc.).

In the example of FIG. 5, the user has entered a temperature setpoint that has a greater value (e.g., 120° F.) than all other setpoints displayed in priority array 402. Priority array 508 of user interface 500 is shown to display a new command 510 labeled "default" which represents the new temperature setpoint just entered by the user. Since the new temperature setpoint was entered by the user and is not based on any current condition of the building area, the command associated with the temperature setpoint is given the lowest priority (16 in the example of FIG. 5). User interface 500 may indicate to the user that new command 510 has a lower priority by the position of command 510 (e.g., below the other commands) and/or the rank associated with command 510 (e.g., rank 16).

User interface 500 may indicate that entering the command 510 would cause controller 206 to bypass or delete other commands in the priority queue. For example, raising the temperature to 120° F. would cause controller 206 to bypass multiple commands which instruct controller 206 to keep the temperature of the building area at 109° F. or 111° F. Commands which are bypassed or deleted can be shown in strikethrough, translucent text, colored text, or otherwise indicated as commands which will be removed from priority array 508 if command 510 is saved. By presenting priority array 508 and new command 510 in such a manner, the user may see that the temperature setting that he or she entered has a relatively dramatic effect on the operation of controller 206.

User interface 500 may include a save button 512 and cancel button 514 that allows the user to save a command (thereby causing the command to be implemented by controller 206) or to cancel a command (causing controller 206 to return to normal operation and controlling the temperature of the building area based on its control algorithm).

Referring now to user interface 600 of FIG. 6, the user has selected the release command from field 410 of user interface 400. User interface 600 is shown displaying a preview of how priority array 602 would be affected by a user releasing a command in priority array 602. The release command may generally relate to requesting that the controller release the current command being followed, and to follow another command with a lower priority. In the example of FIG. 6, the release command may cause command 604 (the override command) of priority array 602 to be released, and for the next highest priority command 606 to be followed instead by controller 206. By presenting user interface 600 to the user, the user can see the impact of causing the controller to no longer follow override command 604, as well as showing the next command that would be followed by the controller.

The user interfaces of FIGS. 4-6 generally allow the user to see the impact of a user-entered command on the operation of controller 206. For example, when a user enters a command with an outlier value (such as shown in FIG. 5), the user may see that a number of pre-entered commands would be bypassed in order for the user-entered command to be followed. The user may reconsider the value before confirming his or her command to system manager 202. As another example, when the user wishes to release the current command or control algorithm for the controller, the user may see which other commands or default settings would then be followed by the controller in the future. The user interfaces of FIGS. 4-6 allow the user to see the impact of the changes before (or without) providing the commands for execution by controller 206. For example, a preview of the priority array, including the changes, can be shown to the user before the changes are written to the priority array.

Figure 7:
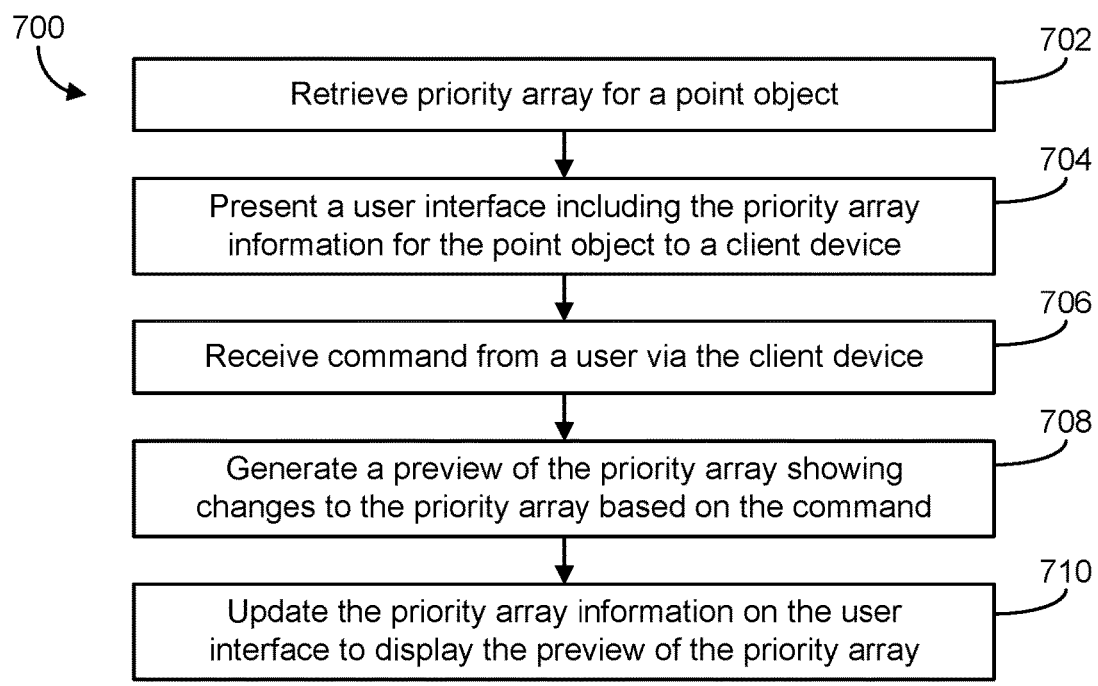
FIG. 7 is a flowchart of a process for adjusting and previewing a priority array for a point object, according to an exemplary embodiment.

Referring now to FIG. 7, a flowchart of a process 700 for providing a priority array user interface to a user is shown, according to an exemplary embodiment. Process 700 may be executed by, for example, system manager 202 and more particularly UI module 310. Process 700 generally includes presenting priority array information for a point object to the user, and providing the user with an impact of a user-generated command to the priority array and the point object.

Process 700 includes retrieving a priority array for a point object (block 702) and presenting a user interface including the priority array information (block 704). In some embodiments, block 702 includes retrieving the priority array from controller 206 via one or more communication methods between system manager 202 and controller 206 as described above, or system manager 202 may store the priority array itself. The user interface is generated based on the priority array and presented to the user on a client device as described above.

Process 700 further includes receiving a command from the user (block 706) and generating a preview of the priority array showing changes to the priority array based on the command (block 708). For example, block 706 may include the user entering a new command for the controller to follow, such as a change in a current temperature setpoint. System manager 202 may receive the new command and determine one or more commands in the priority array that would be impacted by the new command. For example, system manager 202 may identify which commands would be skipped or passed over in order to execute the new command at the controller. Process 700 is shown to include updating the priority array in the user interface to display the preview of the priority array (block 710). Block 710 may include adding or modifying any number of user interface features that highlight which commands are impacted by the new command entered by the user.

Process 700 may further include one or more steps for confirming the new command. For example, after viewing the impact of the new command on the operation of a controller, the user may choose to confirm the new command or cancel the new command. Process 700 may further include various steps for adjusting the user interface to reflect the possible changes in the operation of the controller.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   a controller for one or more devices of the building management system, the controller comprising a priority array for a point object managed by the controller, the priority array comprising a plurality of commands for the point object and defining a priority of each command; and
   a system manager communicably coupled to the controller, the system manager configured to:
      retrieve the priority array from the controller;
      generate a user interface identifying the plurality of commands in the priority array and the priority of each command;
      receive a requested change to the priority array from a user; and
      update the user interface to include a preview of the priority array indicating how the priority array would change if the requested change were applied to the priority array, the preview showing:
         an indication corresponding to a type of requested change of a plurality of types of requested changes comprising: an addition of a new command to the priority array, a modification of one of the plurality of commands in the priority array, a removal of one of the plurality of commands in the priority array, and a release of one of the plurality of commands in the priority array; and
         an indication of which command in the priority array would have a highest priority if the requested change were applied to the priority array; and apply the requested change to the priority array;
      wherein the controller is configured to control the one or more devices in accordance with the plurality of commands in the priority array after applying the requested change.

2. The building management system of claim 1, wherein the system manager is configured to:
   present the preview of the priority array to the user before the requested change is applied to the priority array to allow the user to preview an effect of the requested change before the requested change takes effect.

3. The building management system of claim 1, wherein the system manager is configured to:
   determine whether the new command is the command that would have the highest priority; and
   in response to a determination that the new command would not have the highest priority, update the user interface to include a notification that the new command will not affect an operation of the controller because another command in the priority array has a higher priority.

4. The building management system of claim 1, wherein the requested change is a request to adjust a value of the point object.

5. The building management system of claim 4, wherein the system manager is configured to:
   identify one or more of the plurality of commands in the priority array that would be bypassed or deleted as a result of applying the requested change to the priority array; and
   update the preview of the priority array to include an indication of which of the plurality of commands in the priority array would be bypassed or deleted.

6. The building management system of claim 4, wherein the system manager is configured to:
   identify a priority of the new command relative to each of the plurality of commands in the priority array; and
   update the preview of the priority array to indicate the priority of the new command relative to each of the plurality of commands in the priority array.

7. The building management system of claim 1, wherein the requested change is a request to release one or more of the plurality of commands in the priority array.

8. The building management system of claim 7, wherein the system manager is configured to:
   identify one or more of the plurality of commands in the priority array that would be deleted as a result of the addition of the new command to the priority array or the modification of one of the plurality of commands in the priority array; and
   update the preview of the priority array to indicate which of the plurality of commands in the priority array would be deleted.

9. The building management system of claim 1, wherein the user interface comprises, for each command in the priority array, an indication of a user that issued the command.

10. A method for previewing changes to a priority array in a building management system, the method comprising:
    retrieving a priority array from a controller for one or more devices of the building management system, the priority array comprising a plurality of commands for a point object managed by the controller and defining a priority of each command;

generating a user interface identifying the plurality of commands in the priority array and the priority of each command;

receiving a requested change to the priority array from a user; and updating the user interface to include a preview of the priority array indicating how the priority array would change if the requested change were applied to the priority array, the preview showing:

an indication corresponding to a type of requested change of a plurality of types of requested changes comprising: an addition of a new command to the priority array, a modification of one of the plurality of commands in the priority array, a removal of one of the plurality of commands in the priority array, and a release of one of the plurality of commands in the priority array; and an indication of which command in the priority array would have a highest priority if the requested change were applied to the priority array; and applying the requested change to the priority array; and causing the controller to control the one or more devices in accordance with the priority array after applying the requested change.

11. The method of claim 10, further comprising:

presenting the preview of the priority array to the user before the requested change is applied to the priority array to allow the user to preview an effect of the requested change before the new command takes effect.

12. The method of claim 10, further comprising:

determining whether the new command is the command that would have the highest priority; and in response to a determination that the new command would not have the highest priority, updating the user interface to include a notification that the new command will not affect an operation of the controller because another command in the priority array has a higher priority.

13. The method of claim 10, wherein the requested change is a request to adjust a value of the point object.

14. The method of claim 13, further comprising:

identifying one or more of the plurality of commands in the priority array that would be bypassed or deleted as a result of applying the requested change to the priority array; and updating the preview of the priority array to include an indication of which of the plurality of commands in the priority array would be bypassed or deleted.

15. The method of claim 13, further comprising:

identifying a priority of the new command relative to each of the plurality of commands in the priority array; and updating the preview of the priority array to indicate the priority of the new command relative to each of the plurality of commands in the priority array.

16. The method of claim 10, wherein the requested change is a command to release one or more of the plurality of commands in the priority array.

17. The method of claim 16, further comprising:

identifying one or more of the plurality of commands in the priority array that would be deleted as a result of the addition of the new command to the priority array or the modification of one of the plurality of commands in the priority array; and updating the preview of the priority array to indicate which of the plurality of commands in the priority array would be deleted.

18. The method of claim 10, wherein the user interface comprises, for each command in the priority array, an indication of a user that issued the command.

* * * * *